(12) United States Patent
Pathan (10) Patent No.: US 10,462,020 B2
(45) Date of Patent: Oct. 29, 2019

(54) NETWORK DEVICE USER INTERFACE

(71) Applicant: Cisco Technology, Inc., San Jose, CA (US)

(72) Inventor: Aijaz Pathan, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 15/434,078

(22) Filed: Feb. 16, 2017

(65) Prior Publication Data
US 2018/0234306 A1    Aug. 16, 2018

(51) Int. Cl.
| | |
|---|---|
| G06F 15/173 | (2006.01) |
| H04L 12/24 | (2006.01) |
| H04L 29/08 | (2006.01) |
| H04L 12/46 | (2006.01) |
| G06F 15/16 | (2006.01) |

(52) U.S. Cl.
CPC .......... *H04L 41/22* (2013.01); *H04L 12/4641* (2013.01); *H04L 41/12* (2013.01); *H04L 67/10* (2013.01); *H04L 69/324* (2013.01); *H04L 69/325* (2013.01)

(58) Field of Classification Search
CPC ................................ H04L 4/22; H04L 69/325
USPC ........................................................ 709/224
See application file for complete search history.

(56) References Cited

U.S. PATENT DOCUMENTS

| | | | |
|---|---|---|---|
| 5,825,775 A | 10/1998 | Chin et al. | |
| 6,133,919 A | 10/2000 | Bormann et al. | |
| 7,263,680 B2 | 8/2007 | Drapeau | |
| 7,278,104 B1 | 10/2007 | DeBruler et al. | |
| 8,185,640 B2 | 5/2012 | Nag et al. | |
| 9,253,043 B2 | 2/2016 | Adolphson | |
| 9,288,117 B1 | 3/2016 | Angrish et al. | |
| 9,350,622 B2 | 5/2016 | Smith et al. | |
| 9,397,898 B2 | 7/2016 | Huliyar et al. | |
| 2002/0095310 A1* | 7/2002 | Kobayashi | G06F 9/4411 713/1 |

(Continued)

FOREIGN PATENT DOCUMENTS

WO    WO 02/087157    10/2002

OTHER PUBLICATIONS

Brown, Ken; ASUS RT-AC3200 Tri-Band Wireless Router Review; Apr. 27, 2015.

(Continued)

*Primary Examiner* — Karen C Tang
(74) *Attorney, Agent, or Firm* — Behmke Innovation Group LLC; James Behmke; Stephen D. LeBarron (57) ABSTRACT

In one embodiment, a system includes a first interface to receive a request to generate a user interface screen for a selected network device, a memory to store configuration data of the selected network device, a processor to generate, using the configuration data of the selected network device, a first user interface screen showing a graphical representation of an internal configuration of the selected network device in each of at least three different abstraction layers from a plurality of different abstraction layers, one of the at least three different abstraction layers including a physical layer showing a plurality of ports of the selected network device, and a second interface to send the first user interface screen for output to a display device. Related apparatus and methods are also described.

19 Claims, 7 Drawing Sheets

(56) References Cited

U.S. PATENT DOCUMENTS

| | | | | |
|---|---|---|---|---|
| 2002/0165961 | A1* | 11/2002 | Everdell | H04L 41/22 709/225 |
| 2003/0041142 | A1* | 2/2003 | Zhang | H04L 41/06 709/224 |
| 2005/0264511 | A1* | 12/2005 | Takaki | G09G 3/20 345/98 |
| 2005/0268236 | A1* | 12/2005 | Kosaka | G09G 5/363 715/718 |
| 2007/0179645 | A1* | 8/2007 | Nixon | G05B 19/042 700/83 |
| 2008/0092069 | A1* | 4/2008 | Chan | G06F 3/04817 715/763 |
| 2008/0285572 | A1* | 11/2008 | Diab | H04L 12/2805 370/401 |
| 2009/0132942 | A1* | 5/2009 | Santoro | G06F 3/0481 715/765 |
| 2009/0285120 | A1* | 11/2009 | Swan | H04L 41/12 370/254 |
| 2011/0058560 | A1* | 3/2011 | Okita | H04L 12/4637 370/395.53 |
| 2012/0102543 | A1 | 4/2012 | Kohli et al. | |
| 2012/0287785 | A1* | 11/2012 | Kamble | H04L 49/356 370/230.1 |
| 2012/0287787 | A1* | 11/2012 | Kamble | H04L 49/70 370/235 |
| 2014/0003294 | A1* | 1/2014 | Komatsu | H04L 41/0823 370/255 |
| 2016/0232871 | A1* | 8/2016 | Zhao | G06F 3/14 |
| 2017/0134831 | A1* | 5/2017 | Talukder | H04N 21/8547 |
| 2018/0101392 | A1* | 4/2018 | Chew | G06F 9/44505 |

OTHER PUBLICATIONS

Cisco; Cisco Network Assistant available on the web at: http://www.cisco.com/c/en/us/products/cloud-systems-management/network-assistant/index.html; accessed Dec. 18, 2016.

Cisco Catalyst 500; Catalyst Express 500 Series Switches Configuration Example; Jun. 13, 2008.

Dell OpenManage Network Manager Version 5.3 Service Pack 2 Quick Start Guide 2014.

Electro Standards Laboratories; 7374 4-Channel RJ45 CAT5e A/B/Offline Switch, Telnet & GUI, available on the web at: http://www.electrostandards.com/ProductDetail/?productId=2436#Model_7374_GUI.

NewNet 2016, Common Element Manager—Network Management; available on the net at: http://newnet.com/business-units/secure-transactions/products/common-element-manager/; accessed on Dec. 18, 2016.

Red Hat Linux; Red Hat Linux: IP Networking; Chapter 2.5. Using NetworkManager with the GNOME Graphical User Interface, available on the web at: US/Red_Hat_Enterprise_Linux/7/html/Networking_Guide/sec-Using_NetworkManager_with_the_GNOME_Graphical_User_Interface.html; Dec. 20, 2016.

SolarWinds Worldwide LLC; Network Device Management Software with Network Configuration Manager, available on the web at: http://www.solarwinds.com/topics/network-device-manager; accessed Dec. 18, 2016.

Zoho Corp; OpUtils—Network Management Tools; available on the web at: https://www.manageengine.com/products/oputils/network-monitoring-tools.html; accessed Dec. 18, 2016.

* cited by examiner

NETWORK DEVICE USER INTERFACE

TECHNICAL FIELD

The present disclosure generally relates to a user interface including a graphical representation for viewing the internal configuration of a network device.

BACKGROUND

Network devices, for example, but not limited to, switches and routers, deployed in networks may include a detailed configuration even for basic switching and routing functions as well as quality of service and access right issues. The staff managing the network may or may not be networking experts and may need extra assistance related to configuration and ongoing management of the network devices. The configuration of network devices is typically viewed using tabulated data.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a system including a first interface to receive a request to generate a user interface screen for a selected network device, a memory to store configuration data of the selected network device, a processor to generate, using the configuration data of the selected network device, a first user interface screen showing a graphical representation of an internal configuration of the selected network device in each of at least three different abstraction layers from a plurality of different abstraction layers, one of the at least three different abstraction layers including a physical layer showing a plurality of ports of the selected network device, and a second interface to send the first user interface screen for output to a display device.

DETAILED DESCRIPTION

Figure 1:
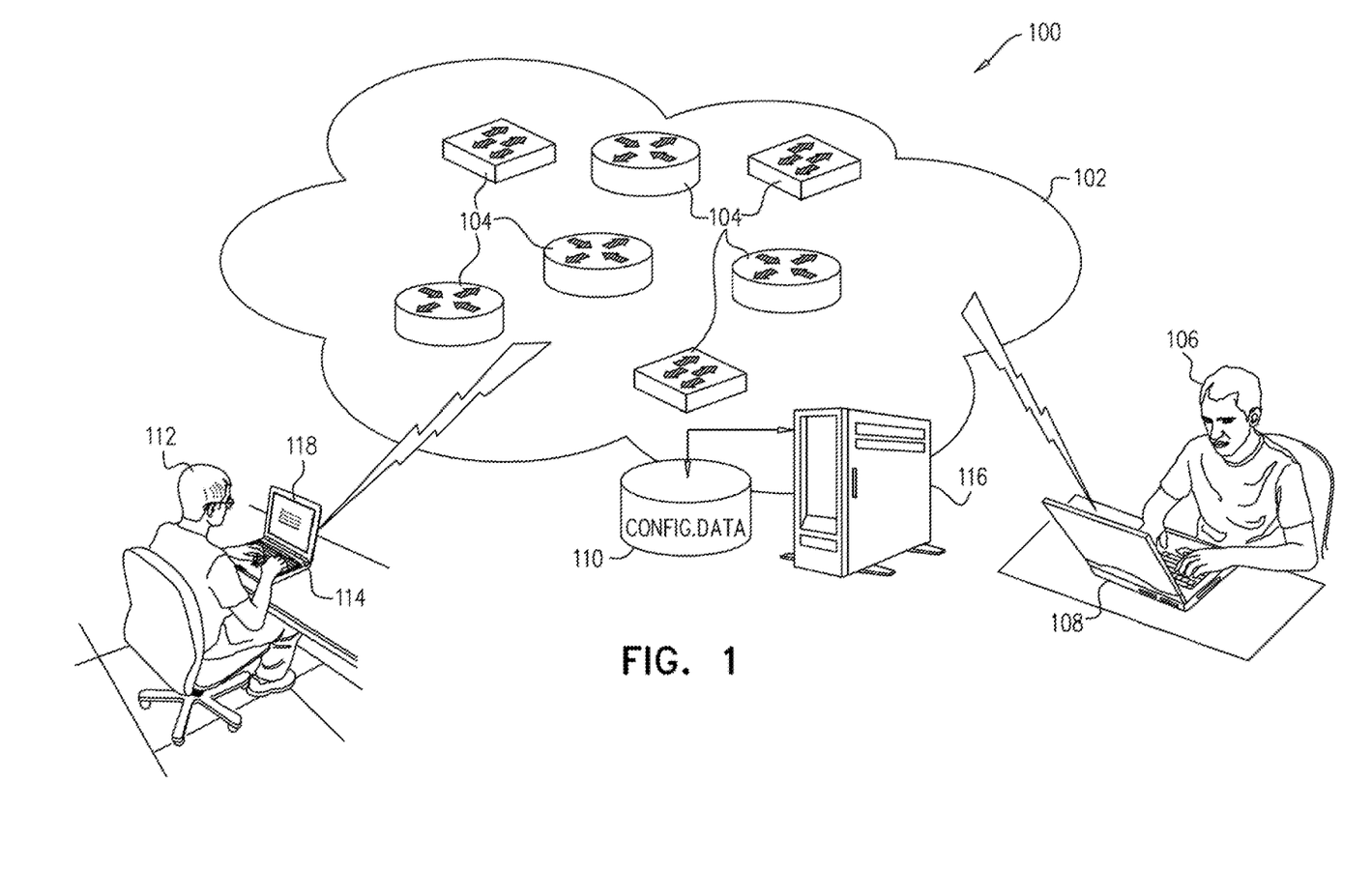
FIG. 1 is a partly pictorial, partly block diagram view of a network device configuration user interface system constructed and operative in accordance with an embodiment of the present disclosure.

Reference is now made to FIG. 1, which is a partly pictorial, partly block diagram view of a network device configuration user interface system 100 constructed and operative in accordance with an embodiment of the present disclosure. FIG. 1 shows a network 102 which includes a plurality of network devices 104 including any suitable network device, for example, but not limited to, switches and routers. The network devices 104 may be configured by one or more network operators 106 (only one shown for the sake of simplicity) from computing devices 108 (only one shown for the sake of simplicity). Configuration data associated with the configuration of the network devices 104 may be stored in one or more storage devices 110 (only one shown for the sake of simplicity). The storage devices 110 may be located in the network 102 (as shown in FIG. 1), in the cloud (not shown) or in one or more of the computing devices 108 (which may be in the network 102 or remote to network 102), by way of example only. It should be noted that some configuration data may be stored in one or more of the network devices 104, for example, but not limited to, configuration data for a particular network device 104 may be stored in one or more storage devices 110 in that network device 104. A user 112 may run a user interface application (not depicted) in order to view a user interface screen showing the internal configuration of any one of the network devices 104. The user interface application prepares a user interface screen(s) based on the stored configuration data for the selected network device 104. The user interface application may run on a local computing device 114 of the user 112 or may run on a server 116 located in the network 102 or elsewhere or in the cloud.

If the user interface application does not run on the local computing device 114, the user interface application receives user input from the local computing device 114 and sends prepared user interface screen(s) back to the local computing device 114 as necessary for display by a display device 118 operationally connected to the local computing device 114. The configuration data for the selected network devices 104 may be retrieved by the local computing device 114 or by the server 116 or cloud application depending on how the applications are configured and where the configuration data is stored.

Figure 2:
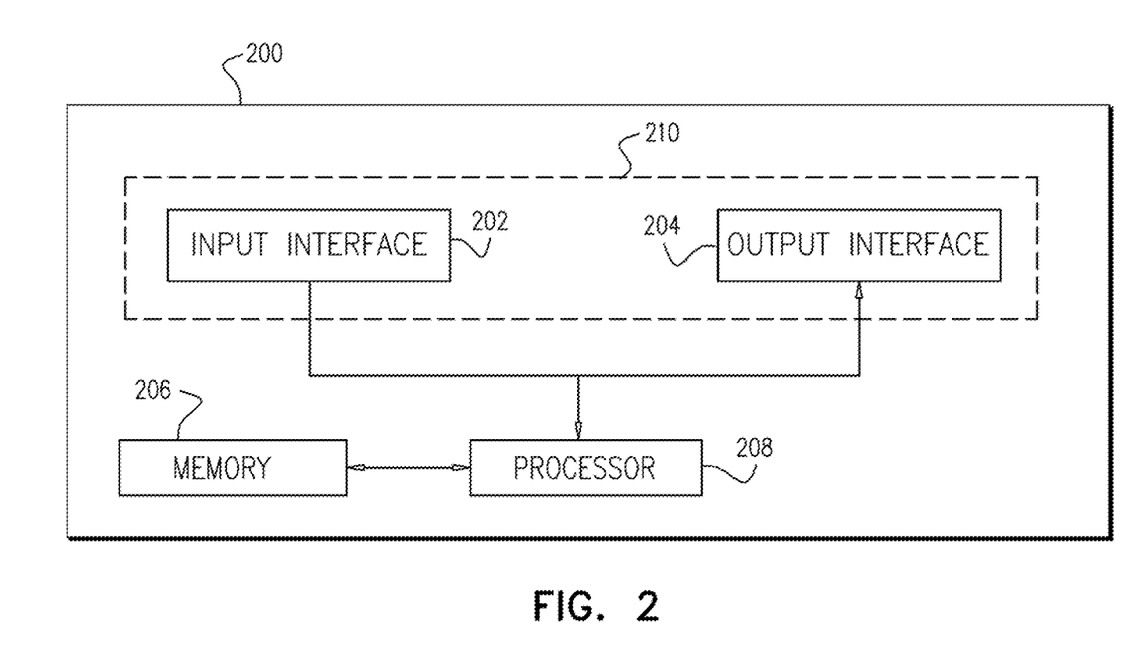
FIG. 2 is a block diagram view of a device for preparing user interface screens in the system of FIG. 1.

It should be noted that the reference numerals listed in FIG. 1 are in the 100-199 range, and the reference numerals in FIG. 2 are in the 200-299 range and so on with all the figures. Therefore, when reference numerals are being discussed, the reader will immediately know which figure the reference numeral appears in.

Reference is now made to FIG. 2, which is a block diagram view of a device 200 for preparing user interface screen(s) in the system 100 of FIG. 1. The device 200 includes an input interface 202, an output interface 204, a memory 206 and a processor 208. The memory 206 is operative to store data used by the processor 208. The processor 208 is operative to prepare user interface screen(s) using the configuration data of the storage device(s) 110 in accordance with user requests. The functionality of the processor 208 and other elements is described in more detail with reference to FIGS. 3-7.

As described above, the user interface application may be run on the server 116, in the cloud or in the local computing device 114. Similarly, the device 200 may be implemented as part of the server 116, as part of the local computing device 114 or by various hardware combinations in a cloud computing environment.

When the device 200 is implemented as part of the local computing device 114, the input interface 202 is operative to receive input from: (a) user input device(s) such as a mouse, a keyboard, and/or a touch screen, by way of example only; and (b) data from network devices and/or remote storage such as the server 116 and storage device(s) 110 by way of example. The input interface 202 may be implemented as two or more input interfaces, one or more for receiving user input and one or more for receiving data from network devices and/or remote storage. The output interface 204 is operative to send the prepared user interface screen(s) to the display device 118.

When the device 200 is implemented as part of the server 116 or the cloud computing environment, the input interface 202 is operative to receive data from the local computing device 114, for example, but not limited to, user inputs and other data and requests from the local computing device 114. The input interface 202 may also be operative to receive network device configuration data from the storage device(s) 110. The output interface 204 is operative to send prepared user interface screens to the local computing device 114 for display by the display device 118. The input interface 202 and the output interface 204 may be implemented as a single input/output interface 210.

It will be appreciated that the device 200 may include other components which are not shown, but typically comprise standard components which are known in the art, for example, but not limited to, a data bus for connecting the various elements of the device 200.

Figure 3:
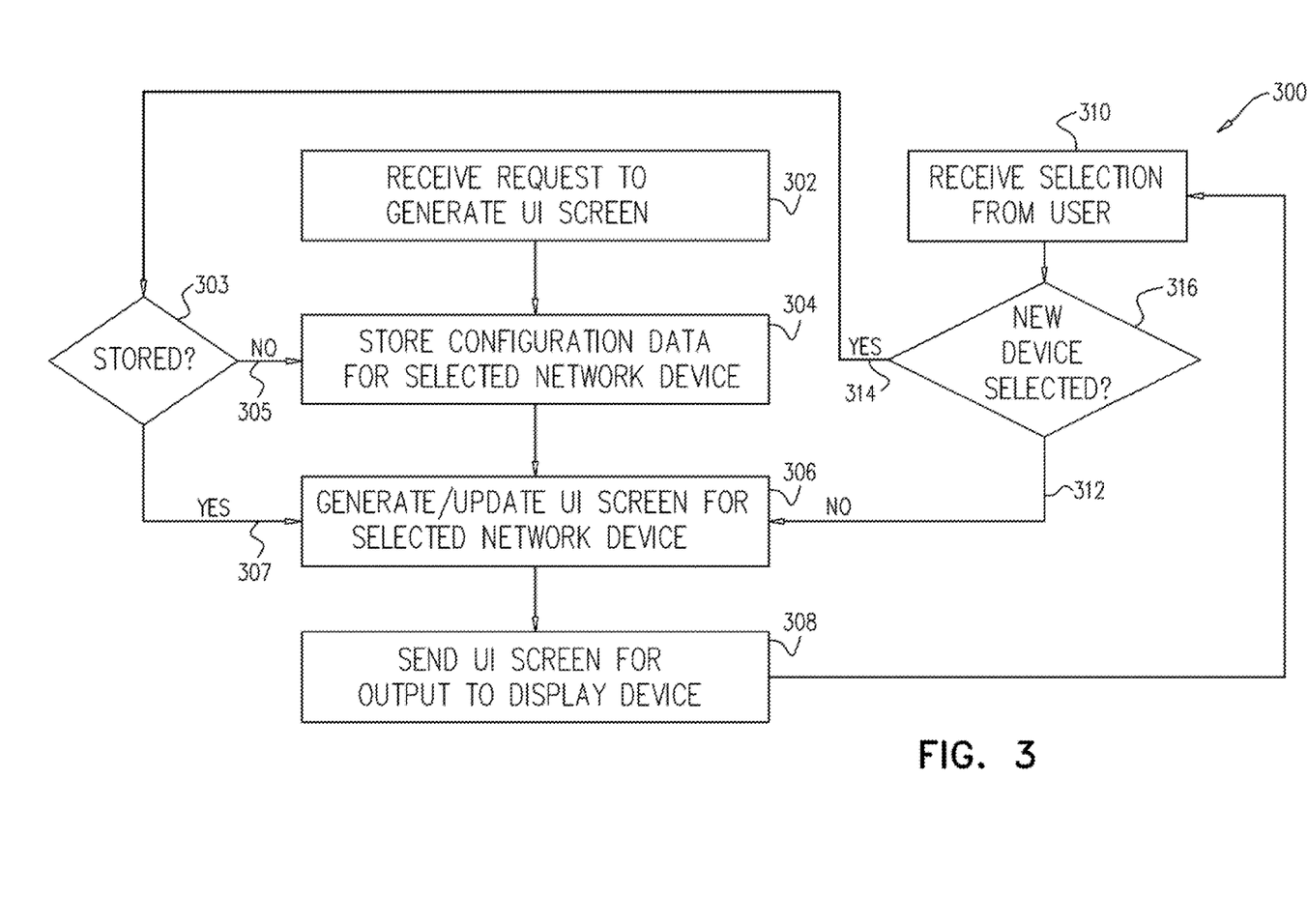
FIG. 3 is a flow chart showing exemplary steps in a method of operation of the device if FIG. 2.

Reference is now made to FIG. 3, which is a flow chart 300 showing exemplary steps in a method of operation of the device 200 if FIG. 2. The input interface 202 receives a request to generate a user interface (UI) screen showing the internal configuration of one of the network devices 104 (block 302). The processor 208 checks if the configuration data for the selected network device 104 is stored in the memory 206 (block 303). If the configuration data for the selected network device 104 was previously stored in the memory 206 (branch 307) the method continues with the step of block 306 described below. If the configuration data for the selected network device 104 was not previously stored (branch 305), the configuration data for the selected network device 104 is retrieved from the storage devices 110 and stored in the memory 206 (block 304) prior to performing the step of block 306 described below. The processor 208 generates a UI screen showing the internal configuration of the selected network device 104 (block 306). The output interface 204 sends the generated UI screen (to the local computing device 114 if the UI is generated by the server 116 or in the cloud computing environment) for output to the display device 118 (block 308). The input interface 202 may receive more selection(s) from the user 112 which may relate to the currently selected network device 104 or may relate to selection of a different one of the network devices 104 (block 310). The processor 208 checks whether the selection relates to the currently selected network device 104 or selection of a different network device 104 (block 316). If the selection relates to an action associated with the currently selected network device 104 (branch 312), the processor 208 updates the current UI screen or generates a new UI screen based on the received selection in the step of block 306. It will be appreciated that updating a UI screen may also be viewed as creating a new UI screen as the updated UI screen is different than the previously generated UI screen. In the description below, updating a UI screen may be understood as changing a UI screen with respect to the features of the previously generated UI screen, wherein unchanged features are generally left in the updated UI screen whereas generating a UI screen may or may not include features of the previously generated screen. If the selection relates to selection of a different network device 104 (branch 314), the method continues with the step of block 304 described above.

Brief reference is now made to FIGS. 4-7, which are views of various UI screens 400, 500, 600, 700 generated by the processor 208, in order to provide an overview prior to describing each of the UI screens 400, 500, 600, 700 in more detail.

Figure 4:
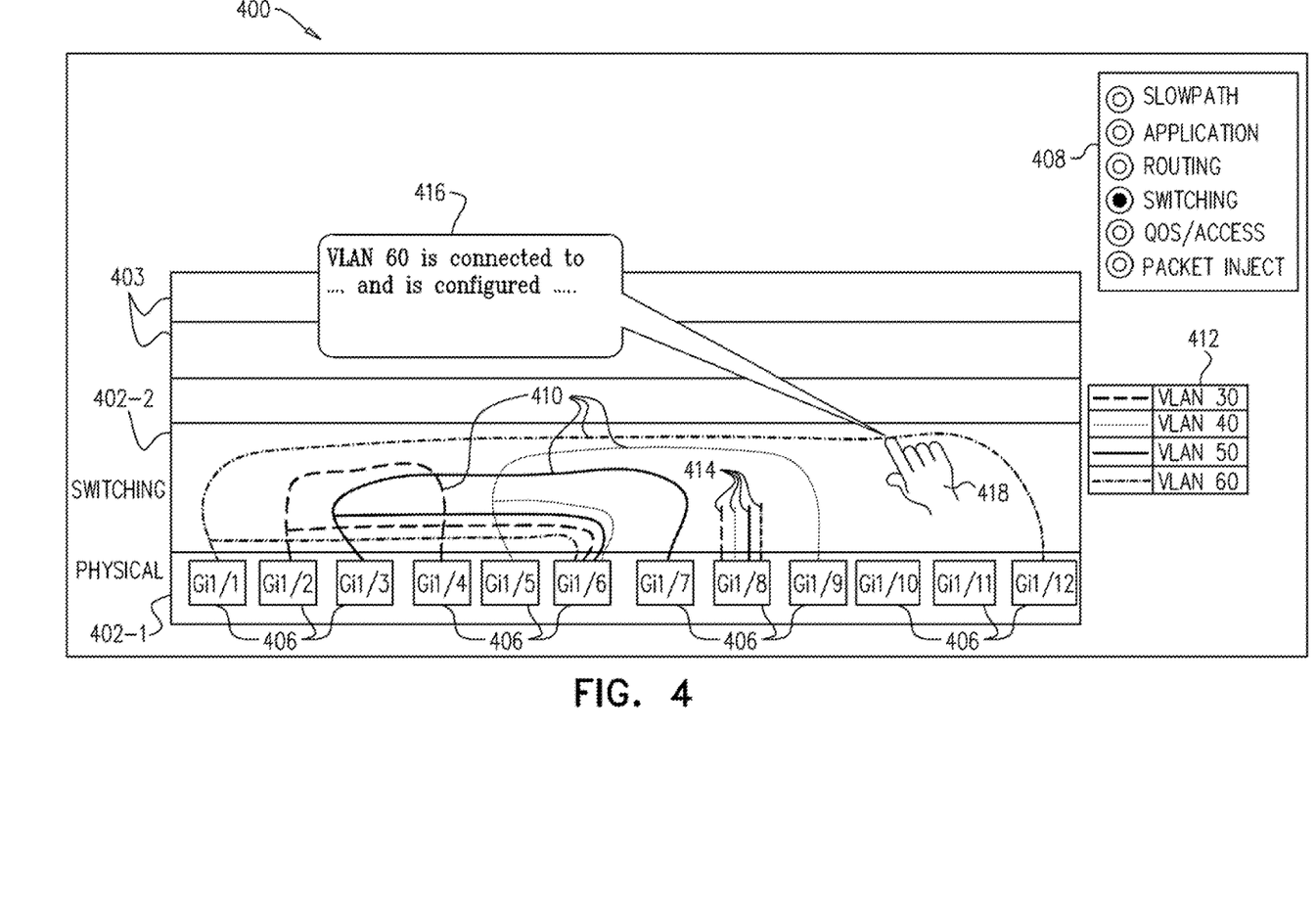
FIG. 4 is a view of a first exemplary user interface screen prepared by the device of FIG. 2.
Figure 5:
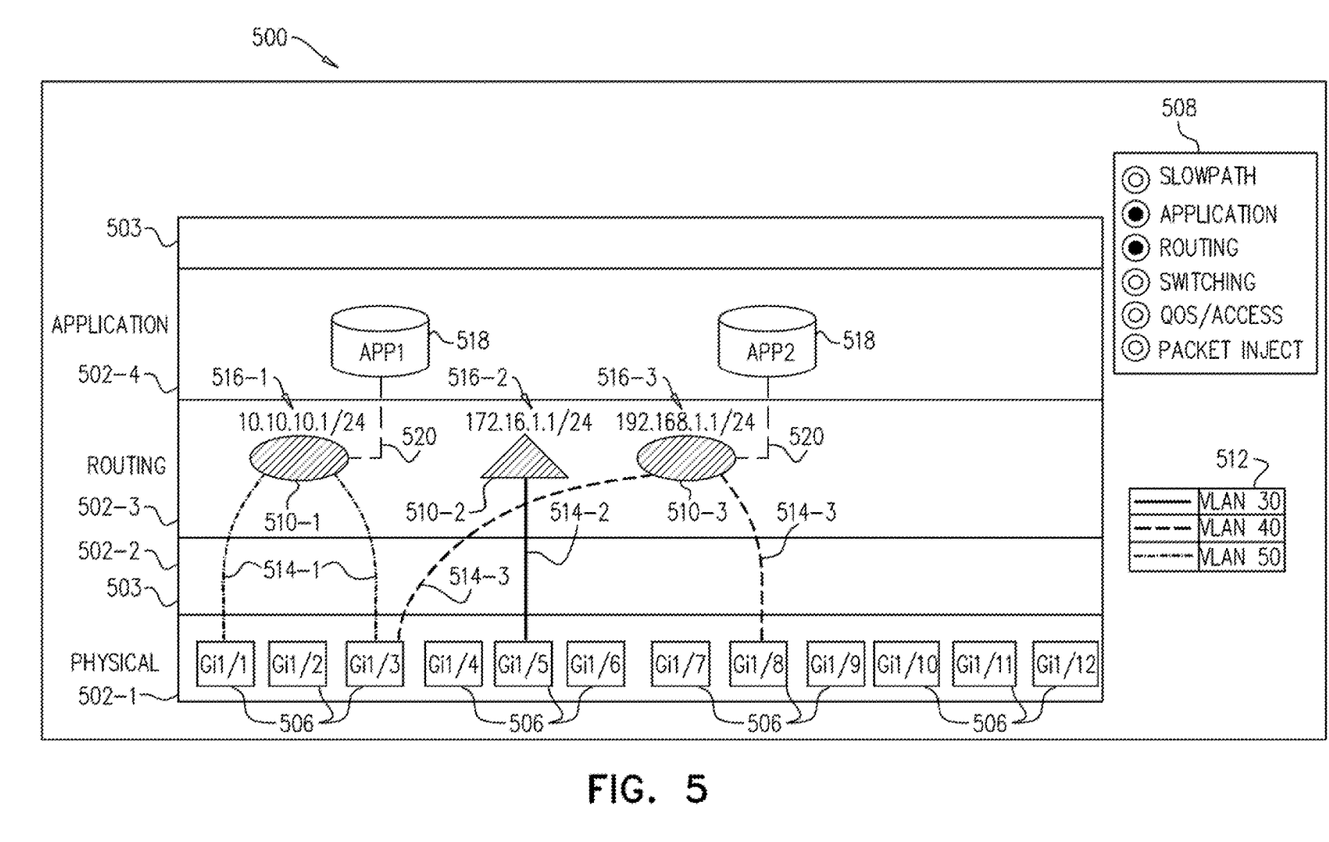
FIG. 5 is a view of a second exemplary user interface screen prepared by the device of FIG. 2.
Figure 6:
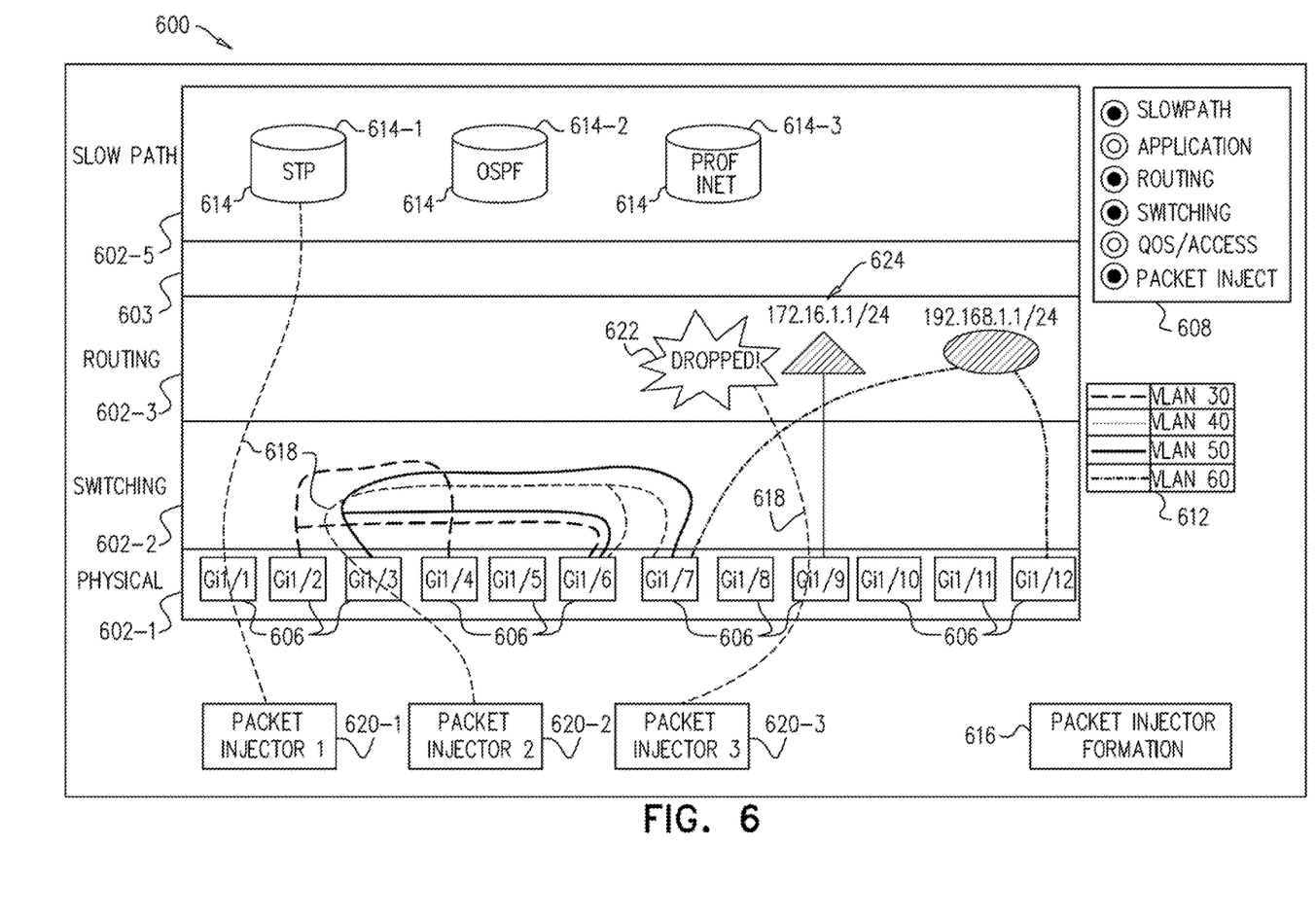
FIG. 6 is a view of a third exemplary user interface screen prepared by the device of FIG. 2.
Figure 7:
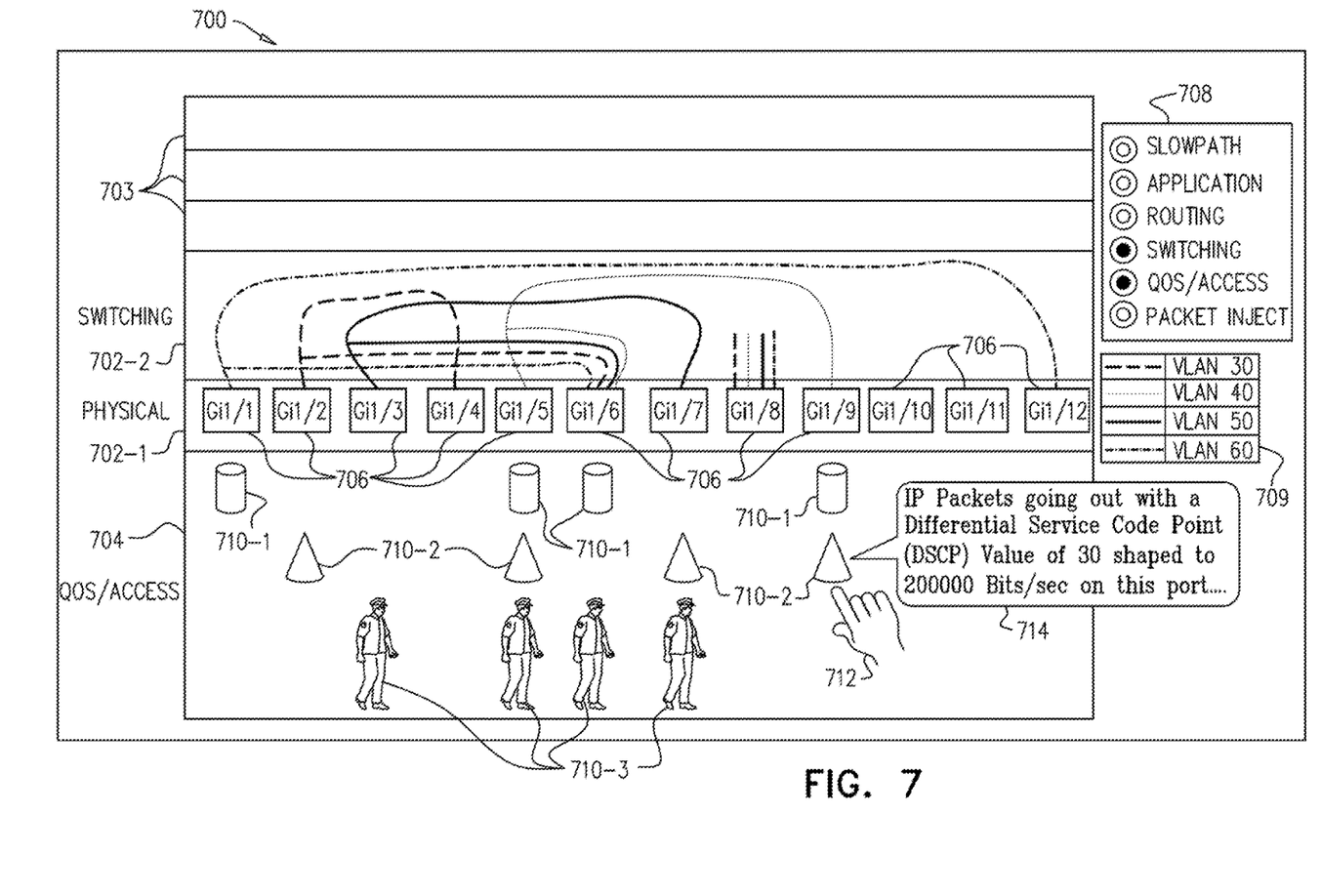
FIG. 7 is a view of a fourth exemplary user interface screen prepared by the device of FIG. 2.

The processor 208 is operative to generate, using the configuration data of the selected network device 104, a user interface screen 400, 500, 600, 700 showing a graphical representation of the internal configuration of the selected network device 104 in two, three or more different abstraction layers 402, 502, 602, 702 from a plurality of different abstraction layers. For example, the UI screen 400 of FIG. 4 shows two abstraction layers 402, the UI screen 500 of FIG. 5 shows three abstraction layers 502, the UI screen 600 of FIG. 6 shows four abstraction layers 602 and the UI screen 700 of FIG. 7 shows two abstraction layers 702 with a quality of service (QOS) and access informational section 704. The abstraction layers 402, 502, 602, 702 shown in the user interface screen 400, 500, 600, 700 are shown as being disposed in different non-overlapping regions of the user interface screen 400, 500, 600, 700, respectively. It will be appreciated that the configuration details of the selected network device 104 in each of the abstraction layers 402, 502, 602, 702 may be shown as overlapping each other even though it will be appreciated that users may find that non-overlapping abstraction layers 402, 502, 602, 702 are easier to understand.

In each of the UI screens 400, 500, 600, 700, the abstraction layers 402, 502, 602, 702 include a physical layer 402-1, 502-1, 602-1, 702-1 showing a plurality of ports 406, 506, 606, 706 of the selected network device 104. In general, the different abstraction layers 402, 502, 602, 702 in addition to the physical layer 402-1, 502-1, 602-1, 702-1 also include a switching layer, a routing layer, an application layer and a slow-path layer. One or more of the abstraction layers 402, 502, 602, 702 in addition to the physical layer 402-1, 502-1, 602-1, 702-1 are user selectable and may be shown in a UI screen. The abstraction layers 402, 502, 602, 702 in addition to the physical layer 402-1, 502-1, 602-1, 702-1 may be selectable using a selection tool 408, 508, 608, 708 as shown in FIGS. 4-7 by selecting one or more of the abstraction layers 402, 502, 602, 702 listed in the selection tool 408, 508, 608, 708. Alternatively or additionally, the abstraction layers 402, 502, 602, 702 may be selected using any suitable selection method, for example, but not limited to, a pull down menu (not shown), or expansion and contraction buttons (not shown) disposed in or around each of the abstraction layers 402, 502, 602, 702. Non-selected abstraction layers 402, 502, 602, 702 may be completely removed from the UI screens 400, 500, 600, 700 or the non-selected abstraction layers 402, 502, 602, 702 may be contracted as shown in FIGS. 4-7 and shown as rectangles 403, 503, 603, 703 where the abstraction layers 402, 502, 602, 702 are expandable and contractible based on user selection, by way of example only.

The UI screen 400 of FIG. 4 shows a switching layer 402-2 that was selected by the user 112 using the selection tool 408. The UI screen 500 of FIG. 5 shows a routing layer 502-3 and an application layer 502-4 that were selected by the user 112 using the selection tool 508. The UI screen 600 of FIG. 6 shows a switching layer 602-2, a routing layer 602-3 and a slow-path layer 602-5 that were selected by the user 112 using the selection tool 608. FIG. 6 also shows that packet injector functionality was also selected by the user 112 and is described in more detail with reference to FIG. 6. The UI screen 700 of FIG. 7 shows a switching layer 702-2 that was selected by the user 112 in addition to the informational section 704. The selection of the abstraction layers 402, 502, 602, 702 by the user 112 are received by the input interface 202. It should be noted that the different UI screens 400, 500, 600, 700 are provided for illustrative purposes only and may or may not refer to the same network device 104 and even if they do refer to the same network device 104, the network device 104 may be configured differently in the different FIGS. 4-7.

Reference is now specifically made to FIG. 4, which is a view of the first exemplary UI screen 400 prepared by the device 200 of FIG. 2. The view of the physical layer 402-1 may be enhanced with additional information like 100M versus 1 Gig, small form-factor pluggable (SFP) versus Registered Jack (RJ)45, etc. The additional information may be selected by the user 112 using a suitable selection action on any of the ports 406 to affect the display of the additional information about that port 406. The selection action may include double clicking or hovering over one of the ports 406 by way of example only.

The UI screen 400 shows the switching layer 402-2 where Layer 2 (data link layer of the Open Systems Interconnection (OSI) model) communication occurs. The graphical representation of the internal configuration of the selected network device 104 in the switching layer 402-2 shows how the plurality of ports 406 in the physical layer 402-1 are logically connected inside the selected network device 104 using a plurality of lines 410. Each line 410 is associated with one of a plurality of virtual local area networks (VLANs) as detailed by a legend 412. Each line 410 included in the graphical representation is presented using a presentation type according to the VLAN associated with that line 410. Each VLAN has a different presentation type including at least one of the following: a color; a shading; and a pattern.

The individual ports 406 are labeled Gi1/1-Gi1/12. Ports Gi1/1 and Gi1/12 are access ports for VLAN 60. Ports Gi1/2 and Gi1/4 as access ports for VLAN 30. Ports Gi1/3 and Gi1/7 as access ports for VLAN 50. Ports Gi1/5 and Gi1/9 as access ports for VLAN 40.

FIG. 4 shows two trunk ports, Gi1/6 and Gi1/8. Gi1/6 is shown as being connected to the lines 410 connecting the VLANs to the access ports, whereas Gi1/8 is shown as a set of parallel lines 414 (coded according to the legend 412 of the VLANs) that are not connected to the other lines 410. It will be appreciated that although both versions of the trunk port visualization are shown in FIG. 4, the device 200 may show either the connected version or the non-connected version of the trunk port in the UI screens 400, 500, 600, 700. Therefore, the graphical representation of the internal configuration of the selected network device 104 in the switching layer 402-2 may show a trunk port connection as: (a) the group of lines 414 disposed adjacent to the relevant port 406 (e.g. Gi1/8), the group of lines not being connected to plurality of lines; or (b) as group of lines (e.g., Gi1/6) disposed adjacent to the relevant port 406 connected to two or more of the other lines 410. The device 200 may provide options for the user 112 to determine which of the trunk ports displays should be used. Optionally, the device 200 may automatically determine which trunk port display option should be used depending on how busy the switching layer 402-2 is due to the lines 410.

Each of the lines 410 may be user selectable, for example, by double clicking that line 410 or hovering over that line 410 indicated by a hand symbol 418 in FIG. 4. In such a case, the input interface 202 is operative to receive a user selection of one of the lines 410. In response to the user selection of the line 410, the processor 208 is operative to update the UI screen 400 (or generate a new user interface screen) including configuration details (shown in a balloon 416) about the VLAN associated with the selected line 410. It will be appreciated that the configuration details may be shown in a new screen which may not include all the details of the UI screen 400.

Trunk ports may be configured by default to include all configured VLANs. One or more VLANs may be disallowed or allowed from any trunk port. For example, selecting the line 410 associated with a VLAN may provide the user 112 with an interface for allowing or disallowing the selected VLAN from one or more trunk ports.

Reference is now made to FIG. 5, which is a view of the second exemplary UI screen 500 prepared by the device 200 of FIG. 2. FIG. 5 includes a VLAN legend 512. The switching layer 502-2 in shown collapsed or minimized. The layer above the switching layer 502-2 is the routing layer 502-3 where Layer 3 (network layer of the OSI model) communication occurs.

The graphical representation of the internal configuration of the selected network device 104 in the routing layer 502-3 shows a representation 510 (oval or triangle) of one or more virtual local area network (VLAN) interfaces and an IP address 516 associated with each VLAN interface. FIG. 5 shows a way of differentiating Layer 3 switched virtual interfaces (SVIs) which are virtual routed ports, versus physical interfaces which are configured as routed ports. In FIG. 5, individual ports 506 in the physical layer 502-1 are labeled Gi1/i to Gi1/12. Ports Gi1/1 and Gi1/3 are shown as access ports configured for VLAN 50 which is represented by lines 514-1. There is also an internal SVI (oval 510-1) for VLAN 50 which has an IP address of 10.10.10.1 (arrow 516-1) with a subnet mask of 255.255.255.0. An internal SVI (oval 510-3) for VLAN 40 (represented by lines 514-3) is shown, with IP address of 192.168.1.1 (arrow 516-3) and subnet mask of 255.255.255.0. Interface Gi1/5 is directly configured as a routed port (triangle 510-2) for VLAN 30 (represented by a line 514-2) with an LP address of 172.16.1.1 (arrow 516-2) and subnet mask of 255.255.255.0. It should be noted that in certain configurations of the selected network device 104, there could be a connection (line) between one of the ovals 516-1, 516-3 and the triangle 516-2. The graphical representation of the internal configuration of the selected network device 104 shows the user 112 the Layer 3 interfaces (representations 510) and which ports 506 have access to the Layer 3 interfaces which may help the user 112 directly terminate Layer 3 connections.

Double-clicking the routing layer 502-3 section may reveal a temporary pop-up (not shown) which lists routes, including default routes, in a forwarding table for all destinations learned through dynamic protocols or configured statically by a user.

The graphical representation of the internal configuration of the selected network device 104 in the application layer 502-4 shows at least one application 518 (e.g., APP1 and APP2 in FIG. 5) and logical connections (shown by dotted lines 520) to items in other abstraction layers 502. The applications 518 may be running on the network device 104 and tied to a particular Layer 2 or Layer 3 entity. APP1 and APP2 may be applications that use IP addresses enabling a user to communicate with the applications and open a layer 4 socket and wait for packets to come in to the selected network device 104 and be processed by the applications and optionally return the packets back.

Reference is now made to FIG. 6, which is a view of the third exemplary UI screen 600 prepared by the device 200 of FIG. 2. A VLAN legend 612 is also shown. The graphical representation of the internal configuration of the selected network device 104 in the slow-path layer 602-5 (which may alternatively be referred to as the software forwarding path layer), shows where packets forwarded to a central processing unit (CPU) of the selected network device are processed. Some example protocols and standards are shown as cylinders 614 in the slow-path layer 602-5, for example, but not limited to, Spanning Tree Protocol (STP) (cylinder 614-1), Open Shortest Path First (OSPF) (cylinder 614-2) and pitch acronym for Process Field Net (PROFINET) (cylinder 614-3). The slow-path layer 602-5 may also be classified as part of the application layer in the OSI model. It will be appreciated that the different abstraction layers 602 may be shown in any order and/or two or more layers 602 may be merged into one layer. Furthermore, as is illustrated by the discussion of the slow-path layer 602-5, sub-layers may be broken out of their native abstraction layer, and displayed separately. It will be appreciated that the previous comment may also be applied to the abstraction layers 402, 502, 702 of the UI screens 400, 500, 700, respectively.

The device 200 allows the user 112 to inject virtual test packets with particular characteristics (e.g., destination and/or source media access control (MAC) address, VLAN ID, destination and/or source IP address, quality of service (QoS) characteristics such as Differential Service Code Point (DSCP) values or class of service (COS)) into one of the ports 606 and see on the UI screen 600 what happens to that packet within the selected network device 104. The characteristics for each of the packets may be selected using pull down menus and/or filling details into custom fields in a dialogue box or any other suitable mechanism. The pull down menus and/or filling details into custom fields may be shown by selecting a packet injector formation button 616 or using a function key or key combination or other menu control.

The port 606 into which the prepared test packet 620 is injected may be selected using a pull down menu or selectable list in the dialogue box and then a send button (not shown) is selected. An icon 620 of each test packet is then added to the UI screen 600. A path 618 that the test packet takes in the network device 104 is shown on the UI screen 600 as a dotted line (or any other suitable representation of a path, e.g., a non-dotted line or a series of arrows). Any location that the test packet would be dropped, for example, using a crash symbol 622 or any other suitable symbol is also shown on the UI screen 600. Optionally, the UI screen 600 shows an animation of the icon 620 moving along the path 618 and if applicable shows the packet being dropped wherein the icon 620 becomes the crash symbol 622 which remains on the UI screen 600 for a predetermined period of time before being removed from the UI screen 600 along with the line of the path 618. It will be appreciated that when the animation of the packet is shown on the UI screen 600, using a line to show the path 618 is optional.

Alternatively, after the characteristics of a test packet have been chosen, the icon 620 of the test packet is added to the UI screen 600. The port 606 into which the prepared test packet 620 is injected may be selected by the user 112 dragging and dropping the icon 620 of the test packet into the selected port 606 or by extending a line from the icon 620 of the test packet to the selected port 606.

The device 200 may use a command line interface (CLI) of the network device 104 in order to determine how the test packet will behave in the network device 104.

The packet injector functionality is now described in more detail. The input interface 202 is operative to receive: a selection of a packet type (i.e., packet characteristics) for a test packet; and a selection of one port 606 in which to inject the test packet. The processor 208 is operative to determine the path of the test packet in the selected network device 104 from the selected port 606 based on the configuration data of the selected network device 104. The processor 208 is also operative to generate a user interface screen based on the UI screen 600 (or update the UI screen 600) showing a graphical representation of: the internal configuration of the selected network device 104; what would happen to the test packet in the selected network device 104 if the test packet is injected into the selected port 606; and the path 618 that the test packet would take in the selected network device 104 in two or more of the abstraction layers 602 if the test packet is injected into the selected port 606. Optionally, the processor 208 is operative to generate/update the user interface screen 600 to show an animation of movement of the packet along the path 618 in the selected network device 104.

The following examples are now recited illustrating the packet injector functionality. The icon 620-1 represents a first test packet ("Packet Injector 1") being used to inject a Spanning Tree bridge protocol data unit (BPDU) into port Gi1/1. As the first test packet is a control packet, it is shown as terminating in the STP (cylinder 614-1) block of the slow-path layer 602-5. The icon 620-2 represents a second test packet ("Packet Injector 2") being used to inject a packet with an unlearned Layer 2 destination address into port Gi1/3 which is an access port for VLAN 50. The packet is shown egressing out of port Gi1/6, which is a trunk port, and interface Gi1/7, which is another access port on that same VLAN, VLAN 50. The icon 620-3 represents a third test packet ("Packet Injector 3") being used to inject a packet into port Gi1/9 (a routed port) with a destination IP address (arrow 624) on a subnet for which there is no static route. Injecting this packet shows the packet being dropped (crash symbol 622) in the routing layer 602-3 because there is no default route for the Gi1/9 port.

Reference is now made to FIG. 7, which is a view of the fourth exemplary UI screen 700 prepared by the device 200 of FIG. 2. FIG. 7 shows a VLAN legend 709. The UI screen 700 includes a plurality of symbols 710 (disposed in the QOS and access informational section 704) which when selected by the user 112 provide information about the configuration of the selected network device 104. The symbols 710 may be selected by any suitable selection action such as double-clicking or hovering over one of the symbols 710 (indicated by a hand icon 712 in the example of FIG. 7). The information is typically displayed in a balloon 714 or pop-up, by way of example only. The symbols 710, are exemplary, and may relate to any suitable information about the configuration of the network device 104 on a per port 706 basis. In FIG. 7, three exemplary icons are used, a pipe 710-1 which is associated with policing, a cone 710-2 which is associated for a shaping and an officer 710-3 which is associated with access control. So for example, selecting the cone 710-2 disposed below Gi1/2 provides additional information about which types are packets are subject to shaping by Gi1/2, selecting the pipe 710-1 below Gi1/1 provides additional information about which types of packets are subject to policing by Gi1/1 and selecting the officer 710-3 below Gi1/5 provides an access control list of Gi1/5 and/or which types of packets are discarded by Gi1/5. Depending on the configuration of each of the ports 706, a port 706 may have none or one or more of the following associated with it: the pipe 710-3, the cone 710-2 and the officer 710-3.

Examples follow of how port configuration may be presented as easy to follow information by presenting configuration data in a more readable format.

By way of a first example, the configuration of a "Policer" on port Gi1/1 of the network device 104 may be set up on configuration as follows:

"Policy Map pmap1
Class cos 2
police cir 100000 be 8000
conform-action transmit
exceed-action drop".

When the user 112 selects the pipe 710-1, the above configuration information may be displayed in a more user friendly format as follows:

"VLAN tagged traffic coming in with a class of service of 2 dropped beyond an average rate of 100000 bits/sec on this interface (Policer Configured). At a particular instance, multiple packets adding up to 8000 bytes are allowed."

By way of a second example, the configuration of a "Shaper" on port Gi1/9 of the network device 104 may be set up on configuration as follows:

"Actual Configuration of a "Shaper" on the switch
Policy Map pmap2
Class dscp30
Average Rate Traffic Shaping
cir 200000 (bps)".

When the user 112 selects the cone 710-2, the above configuration information may be displayed in a more user friendly format as follows:

"IP packets going out with a differential service code point (DSCP) value of 30 shaped to 200000 Bits/sec on this interface (Shaper Configured). Shaping implies temporary buffering of packets depending on availability of buffers which could lead to increased latency when there is congestion."

The above text is partly shown in balloon 714. The text of the first and third examples are not shown in FIG. 7 for the sake of simplicity.

By way of a third example, the configuration of an "Access Control List" on port Gi1/3 of the network device 104 may be set up on configuration as follows:

"Extended MAC access list mac-deny
permit any host 1111.2222.3330".

When the user 112 selects the officer 710-3, the above configuration information may be displayed in a more user friendly format as follows:

"Packets coming in with any source MAC address, but with a destination address of 11:11:22:22:33:30 are dropped on this interface (MAC ACL Configured)."

The selection of the symbols 710 and the updating of the UI screen 700 is now described in more detail. The processor 208 is operative to generate the UI screen 700 showing the physical layer 702-1 with the ports 706 of the selected network device 104 (and other abstraction layers 702 if selected by the user 112) and one or more of the selectable symbols 710 disposed adjacent to one of the ports 706 (hereinafter referred to a port A). The input interface 202 is operative to receive a selection of one of the symbols 710. In response to receiving the selection of the selected symbol 710, the processor 208 is operative to generate a user interface screen (or update the UI screen 700) showing information associated with the selected symbol 710. The information may include one or more of the following: a quality of service of port A; which types of packets are subject to policing by the port A; which types are packets are subject to shaping by port A; an access control list of port A; and which types of packets are discarded by port A.

It should be noted that the device 200 may utilize implementing certain switch forwarding behavior in Network Management Software so that the network device 104 operation is not impacted by the device 200. Further, there is certain state information that may need to be collected from the network device 104 for certain advanced forwarding configurations. The device 200 may include a user triggered mechanism or automated feature for retrieving configuration data from the network device 104.

In practice, some or all of the functions of the processor 208 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising:
   a first interface to receive a request to generate a user interface screen for a selected network device;
   a memory to store configuration data of the selected network device;
   a processor to generate, using the configuration data of the selected network device, a first user interface screen showing a graphical representation of an internal configuration of the selected network device in each of at least three different abstraction layers from a plurality of different abstraction layers, one of the at least three different abstraction layers including a physical layer representing the internal configuration of the selected device, the physical layer showing a plurality of ports of the selected network device, wherein the graphical representation of the internal configuration includes connection lines between one or more ports of the plurality of ports and each of the different abstraction layers associated with the one or more ports, and the at least three different abstraction layers except for the physical layer are expandable and contractible based on user selection; and
   a second interface to send the first user interface screen for output to a display device.

2. The system according to claim 1, the plurality of different abstraction layers including a switching layer, a routing layer, an application layer and a slow-path layer.

3. The system according to claim 1, wherein:
the processor is operative to generate a second user interface screen showing a graphical representation of the internal configuration of the selected network device in each of at least two different abstraction layers from the plurality of different abstraction layers, the at least two different abstraction layers including: the physical layer showing the plurality of ports of the selected network device; and at least one abstraction level of the plurality of the plurality of different abstraction layers;
the at least one abstraction layer included in the second user interface screen is user selectable from the plurality of different abstraction layers; and
the first interface is operative to receive a selection of the at least one abstraction layer.

4. The system according to claim 1, wherein the at least three abstraction layers are disposed in three different non-overlapping regions of the first user interface screen, respectively.

5. The system according to claim 1, wherein the at least three abstraction layers include a switching layer where Layer 2, data link layer, communication occurs, the graphical representation of the internal configuration of the selected network device in the switching layer showing how the plurality of ports in the physical layer are logically connected inside the selected network device using a plurality of lines, each one of the plurality of lines being associated with one of a plurality of virtual local area networks (VLANs).

6. The system according to claim 5, wherein each one line of the plurality of lines included in the graphical representation is presented using a presentation type according to one of the plurality of VLANs associated with the one line, each one VLAN of the plurality of VLANs having a different presentation type including at least one of the following: a color; a shading; and a pattern.

7. The system according to claim 5, wherein:
each one of the plurality of lines is user selectable;
the first interface is operative to receive a user selection of one line of the plurality of lines; and
in response to the user selection, the processor is operative to generate a second user interface screen including configuration details about one of the plurality of VLANs associated with the selected one line.

8. The system according to claim 5, wherein the graphical representation of the internal configuration of the selected network device in the switching layer shows a trunk port connection as a group of lines disposed adjacent to one port of the plurality of port, the group of lines not being connected to plurality of lines.

9. The system according to claim 5, wherein the at least three abstraction layers include a routing layer where Layer 3, network layer, communication occurs, the graphical representation of the internal configuration of the selected network device in the routing layer showing a representation of at least one VLAN interface and at least one IP address associated with the at least one VLAN interface.

10. The system according to claim 1, wherein the at least three abstraction layers include a routing layer where Layer 3, network layer, communication occurs, the graphical representation of the internal configuration of the selected network device in the routing layer showing a representation of at least one virtual local area network (VLAN) interface and at least one IP address associated with the at least one VLAN interface.

11. The system according to claim 1, wherein the at least three abstraction layers include an application layer, the graphical representation of the internal configuration of the selected network device in the application layer showing at least one application.

12. The system according to claim 1, wherein the at least three abstraction layers include a slow-path layer, the graphical representation of the internal configuration of the selected network device in the slow-path layer showing where packets forwarded to a central processing unit (CPU) of the selected network device are processed.

13. The system according to claim 1, wherein:
the processor is operative to generate a second user interface screen showing the physical layer with the plurality of ports of the selected network device and a first selectable symbol disposed adjacent to a first port of the plurality of ports;
the first interface is operative to receive a selection of the first selectable symbol; and
in response to receiving the selection of the first selectable symbol, the processor is operative to generate a third user interface screen showing information associated with the first selectable symbol, the information including one or more of the following: quality of service of the first port; which types of packets are subject to policing by the first port; which types are packets are subject to shaping by the first port; an access control list of the first port; and which types of packets are discarded by the first port.

14. The system according to claim 1, wherein:
the first interface is operative to receive: a selection of a first packet type for a first packet; and a selection of a first port of the plurality of ports in which to inject the first packet; and
the processor is operative to generate a second user interface screen showing a graphical representation of: the internal configuration of the selected network device; what would happen to the first packet in the selected network device if the first packet is injected into the first port; and a path that the first packet would take in the selected network device in at least two of the at least three different abstraction layers if the first packet is injected into the first port.

15. The system according to claim 14, wherein the processor is operative to generate the second user interface screen to show an animation of movement of the first packet along the path in the selected network device.

16. A method comprising:
receiving a request to generate a user interface screen for a selected network device;
storing configuration data of the selected network device;
generating, using the configuration data of the selected network device, a first user interface screen showing a graphical representation of an internal configuration of the selected network device in each of at least three different abstraction layers from a plurality of different abstraction layers, one of the at least three different abstraction including a physical layer representing the internal configuration of the selected device, the physical layer showing a plurality of ports of the selected network device, wherein the graphical representation of the internal configuration includes connection lines between one or more ports of the plurality of ports and each of the different abstraction layers associated with the one or more ports, and the at least three different abstraction layers except for the physical layer are expandable and contractible based on user selection; and sending the first user interface screen for output to a display device.

17. The method according to claim 16, wherein:

the at least three abstraction layers include a switching layer where Layer 2, data link layer, communication occurs, the graphical representation of the internal configuration of the selected network device in the switching layer showing how the plurality of ports in the physical layer are logically connected inside the selected network device using a plurality of lines, each one of the plurality of lines being associated with one of a plurality of virtual local area networks (VLANs); and the at least three abstraction layers include a routing layer where Layer 3, network layer, communication occurs, the graphical representation of the internal configuration of the selected network device in the routing layer showing a representation of at least one VLAN interface and at least one IP address associated with the at least one VLAN interface.

18. The method according to claim 16, wherein:

receiving a selection of a first packet type for a first packet;

receiving a selection of a first port of the plurality of ports in which to inject the first packet;

generating a second user interface screen showing a graphical representation of: the internal configuration of the selected network device; what would happen to the first packet in the selected network device if the first packet is injected into the first port; and a path that the first packet would take in the selected network device in at least two of the at least three different abstraction layers if the first packet is injected into the first port.

19. A tangible, non-transitory, computer-readable medium storing program instructions that cause a device to execute a process comprising:

receiving a request to generate a user interface screen for a selected network device;

storing configuration data of the selected network device;

generating, using the configuration data of the selected network device, a first user interface screen showing a graphical representation of an internal configuration of the selected network device in each of at least three different abstraction layers from a plurality of different abstraction layers, one of the at least three different abstraction layers including a physical layer representing the internal configuration of the selected device, the physical layer showing a plurality of ports of the selected network device, wherein the graphical representation of the internal configuration includes connection lines between one or more ports of the plurality of ports and each of the different abstraction layers associated with the one or more ports, and the at least three different abstraction layers except for the physical layer are expandable and contractible based on user selection; and sending the first user interface screen for output to a display device.

* * * * *

UNITED STATES PATENT AND TRADEMARK OFFICE
CERTIFICATE OF CORRECTION

PATENT NO. : 10,462,020 B2  
APPLICATION NO. : 15/434078  
DATED : October 29, 2019  
INVENTOR(S) : Aijaz Pathan Page 1 of 1

It is certified that error appears in the above-identified patent and that said Letters Patent is hereby corrected as shown below:

In the Specification

Column 6, Line 29, please amend as shown:  
labeled Gi1/1 to Gi1/12. Ports Gi1/1 and Gi1/3 are shown as Column 6, Line 38, please amend as shown:  
(represented by a line 514-2) with an IP address of Column 9, Line 5, please amend as shown:  
Class cos2

Column 9, Line 6, please amend as shown:  
police cir 100000 bc 8000

Signed and Sealed this  
Fourteenth Day of January, 2020

Andrei Iancu  
*Director of the United States Patent and Trademark Office*